Aug. 26, 1930.   H. W. PAYNE ET AL   1,774,400
DEVICE FOR COLLAPSING AND ADJUSTING SPLIT RIMS OF VEHICLE WHEELS
Filed Jan. 13, 1930
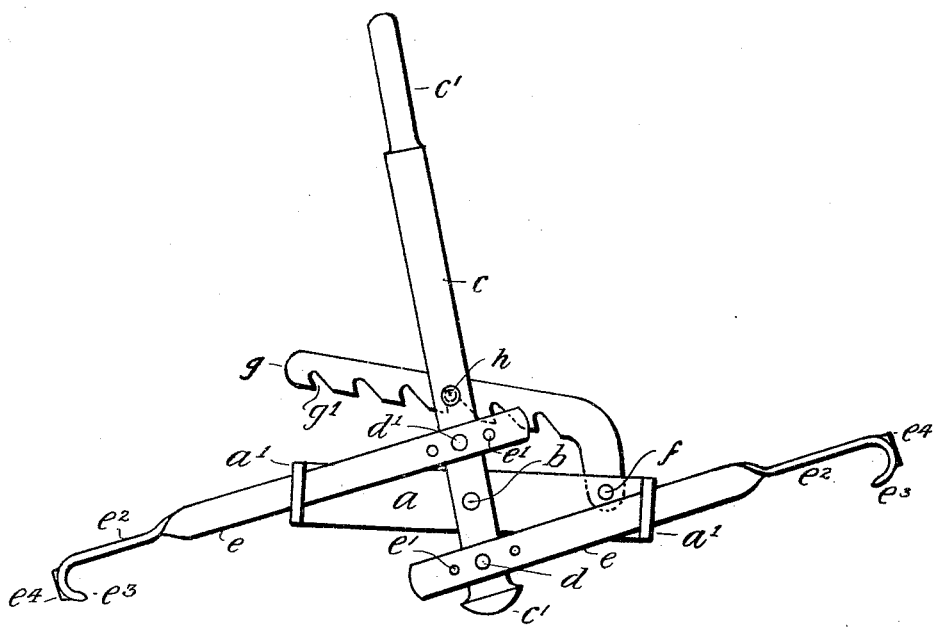
Howard William Payne
Harry John Puckridge
Leslie Evans
INVENTORS Patented Aug. 26, 1930

1,774,400

UNITED STATES PATENT OFFICE

HOWARD WILLIAM PAYNE, OF FIRLE, HARRY JOHN PUCKRIDGE, OF KINGSWOOD, AND LESLIE EVANS, OF FULLARTON ESTATE, SOUTH AUSTRALIA, AUSTRALIA

DEVICE FOR COLLAPSING AND ADJUSTING SPLIT RIMS OF VEHICLE WHEELS

Application filed January 13, 1930, Serial No. 420,418, and in Australia November 25, 1929.

Our invention relates to an improved device for collapsing and adjusting split rims of vehicle wheels.

According to modern practice the metal rims of wheels for vehicles such as automobiles are constructed with a split across the tread and flange of the rim, making a severance with abutting ends, such splits being designed for the purpose of enabling one portion of the rim to be deflected inwardly to facilitate the attachment or the displacement of rubber tires according to requirements.

The object of our invention is to provide an implement to facilitate the contraction and subsequent adjustment of the rim for the emplacement or removal of the tire, thereby rendering the operation of changing tires more easy of attainment.

We will now describe our invention in detail by aid of the accompanying illustration wherein:—

Fig. 1 is a front elevation of our device in which the constructional parts are marked with letters for the purpose of reference.

In the manufacture of our invention we construct a main guide frame of metal as shown at $a$, the ends $a'$ of which are deflected outwardly at right angles and formed with guide slots for supporting sliding hook bars.

In or near the centre of this frame we insert a fulcrum pin $b$ upon which an oscillating lever $c$ is mounted, said lever being approximately the same length from its fulcrum pin to its lower extremity $c'$ as the depth of the rim and tire of a motor wheel so that it may rest on the ground, the lower end of the lever being suitably shaped to form a foot or bearing end, its upper end being extended in the form of a handle $c^2$ and may be adapted for the reception of an extension lever.

Above and below the fulcrum pin we provide pivot pins $d$ and $d'$ for the support of hook bars $e$, said bars being respectively passed through the holes in the ends $a'$ of the guide frame $a$. These hook bars extend outwardly, their ends being twisted as at $e^2$ and their extremities being bent to form a hook $e^3$.

Either or both of the bars $e$ are reversible so as to enable the operator to set both hooks in a downward direction as illustrated, or both hooks may be set in an upward direction, or one hook may operate in an upward position whilst the other is deflected downwardly, the last named position being very serviceable for some types of split rims, and adjustment holes $e'$ are also provided, the hooks being adapted to engage the flange of the split rim on opposite sides of the rim.

The outer ends of the hooks instead of being round are preferably flattened as indicated at $e^4$ so that the backs form an abutting surface which is adapted to impinge upon the exposed inner edge of the rim after the hooks have been disengaged so that by a reverse movement of the handle they may exert pressure on the inner surface of the rim to cause it to spring back into its proper running position after having been contracted for the removal or reception of a tire.

In addition to these parts we arrange a supporting pin $f$ near to one of the ends of the bar $a$, upon which a bent locking bar $g$ is pivotally mounted, said bar having its lower edge furnished with a series of recesses or ratchet cuts $g'$ which are adapted to be engaged by a locking pin $h$ which is secured to the lever for the purpose of maintaining the lever in any desired position after the rim has been contracted and whilst a tire is being fitted or removed for replacement.

The method of operation may be briefly described as follows:—

If it is desired to contract the rim to enable a tire to be removed and to facilitate the emplacement of a new tire, our device is set up in such a manner that the hook end of one of the bars engages the rim adjacent to its split whilst the end of the opposite hook bar engages the flange of the rim on the opposite side of the centre.

When this has been done the lever is operated so that the two hooks are drawn together by radial movement of the lever, thus springing the rim inwards. This movement reduces the effective diameter of the rim and enables the tire to be easily removed so that another tire can be mounted in its stead.

During this period the ratchet pin is engaged in the ratchet slot and maintains the hook bars in the desired relative position.

After the new tire has been mounted the ratchet is disengaged from the ratchet pin and the handle is swung in the opposite direction, thus releasing the rim.

Under normal conditions the rim will return to its proper position but it frequently happens that pressure is required to assist the complete return of the rim to its proper place. In such cases the thrust surfaces on the outside of the hooks, which are designed and shaped so as to prevent them from slipping, are placed against the tread of the rim in a suitable position so that by exerting pressure on the lever in the opposite direction the hook bars move outwardly, thus forcing the rim back to conform with its proper adjusted diameter.

What we claim is :—

In an improved device for collapsing and adjusting split rims of vehicle wheels, a guide frame having deflected ends in which guide slots for hook bars are formed, a lever swingingly attached to a fulcrum pin which is secured to the frame, and hook bars terminating with hook ends, said bars being supported within the deflected ends of the frame and being pivotally attached to the lever by pins arranged on either side of the fulcrum pin for contracting a portion of the rim.

HOWARD WILLIAM PAYNE.
HARRY JOHN PUCKRIDGE.
LESLIE EVANS.